(12) United States Patent
Xia

(10) Patent No.: US 12,338,851 B1
(45) Date of Patent: Jun. 24, 2025

(54) AUTOMATIC POSITIONING BOLT

(71) Applicant: Wenjie Xia, Suizhou (CN)

(72) Inventor: Wenjie Xia, Suizhou (CN)

( * ) Notice: Subject to any disclaimer, the term of this patent is extended or adjusted under 35 U.S.C. 154(b) by 0 days.

(21) Appl. No.: 18/888,060

(22) Filed: Sep. 17, 2024

(51) Int. Cl.
*F16B 21/12* (2006.01)
*F16B 7/04* (2006.01)
*F16B 35/04* (2006.01)

(52) U.S. Cl.
CPC ............ *F16B 35/041* (2013.01); *F16B 7/042* (2013.01); *F16B 21/12* (2013.01); *F16B 2200/83* (2023.08); *F16B 2200/99* (2023.08)

(58) Field of Classification Search
CPC ........ F16B 7/042; F16B 7/0426; F16B 7/182; F16B 21/12
USPC ..... 411/356; 403/109.3, 109.6, 109.7, 109.8; 292/175
See application file for complete search history.

(56) References Cited

U.S. PATENT DOCUMENTS

| | | | | |
|---|---|---|---|---|
| 2,910,887 A | * | 11/1959 | Helms | B62D 1/184 74/493 |
| 4,810,148 A | * | 3/1989 | Aisa | B03C 1/286 411/908 |
| 5,634,755 A | * | 6/1997 | Jones, Jr. | B03C 1/286 411/383 |
| 6,869,243 B1 | * | 3/2005 | Teeter | F16B 7/105 403/378 |
| 9,091,293 B1 | * | 7/2015 | Tseng | F16B 21/12 |
| 11,982,303 B2 | | 5/2024 | Polidori | |
| 12,044,262 B2 | * | 7/2024 | Baeuerle | F16B 19/109 |
| 2007/0003361 A1 | * | 1/2007 | Wang | F16B 7/105 403/109.3 |

* cited by examiner

*Primary Examiner* — Flemming Saether
(74) *Attorney, Agent, or Firm* — Ying-Ting Chen; Law Office of Michael Chen

(57) ABSTRACT

An automatic positioning bolt, includes a bolt body, a mounting hole penetrated through the bolt body, a compression spring provided inside the mounting hole, an insert rod provided below the compression spring, an insert hole provided inside the insert rod, a positioning rod provided inside the insert hole, and a magnet rod arranged at the lower end of the insert rod. The bolt can ensure a firm connection between the object and the iron plate, prevent the object from moving when subjected to force, and enable the bolt to flexibly apply in various occasions for connection, and to maintain a stable connection during long-term use.

5 Claims, 4 Drawing Sheets

AUTOMATIC POSITIONING BOLT

FIELD OF THE INVENTION

The present invention relates to the technical field of bolts, in particular to an automatic positioning bolt.

BACKGROUND OF THE INVENTION

Bolts are common mechanical parts, cylindrical threaded fasteners equipped with nuts. They are composed of a head and a rod, which need to be matched with nuts to fasten two parts with through holes. The bolts are tools gradually fasten the object and parts, uses the physics and mathematical principles of the circular rotation of the inclined surface and the friction force of the object. This type of connection is called bolt connection. If the nut is unscrewed from the bolt, the two parts can be separated, therefore, bolt connection is a detachable connection. The bolts of prior arts only have the function of fastening, and do not have the function of automatic positioning, which causes inconvenience to the use.

Therefore, the present invention provides an automatic positioning bolt to solve the above problems.

SUMMARY OF THE DISCLOSURE

In view of the above situation, in order to overcome the shortcomings of the prior arts, the present invention provides an automatic positioning bolt, which effectively solves the problem that the bolts of prior arts do not have the automatic positioning function.

In order to achieve the above purpose, the present invention provides the following technical solutions:

An automatic positioning bolt includes a bolt body, wherein a mounting hole penetrate from top to bottom is provided inside the bolt body, a compression spring is provided in the mounting hole, an insert rod located below the compression spring is provided in the mounting hole, an insert hole is provided inside the insert rod, a positioning rod located in the insert hole is provided inside the insert hole, and a magnet rod is provided at the lower end of the insert rod.

Preferably, a positioning hole is provided at the bottom of the insert rod, and the magnet rod is installed inside the positioning hole.

Preferably, external threads are provided on the outer surface of the bolt body, and a hexagonal block is fixedly connected to the top end of the bolt body.

Preferably, a blocking ring is fixedly connected to the top of the mounting hole.

Preferably, a round block is fixedly connected to the top end of the positioning rod, a connecting block is fixedly connected to the top end of the round block, and a notch provided on the connecting block.

Preferably, the positioning rod is threadedly connected to the insert hole.

Compared with the prior arts, the beneficial effects of the present invention are:

The bolt can ensure a firm connection between the objects and prevent the object from moving when subjected to force, which make the bolt be flexibly applied in various occasions for connection. In addition, it can also maintain a stable connection during long-term use, thereby improving the convenience of the bolt.

DETAILED DESCRIPTION OF THE PREFERRED EMBODIMENTS

Figure 1:
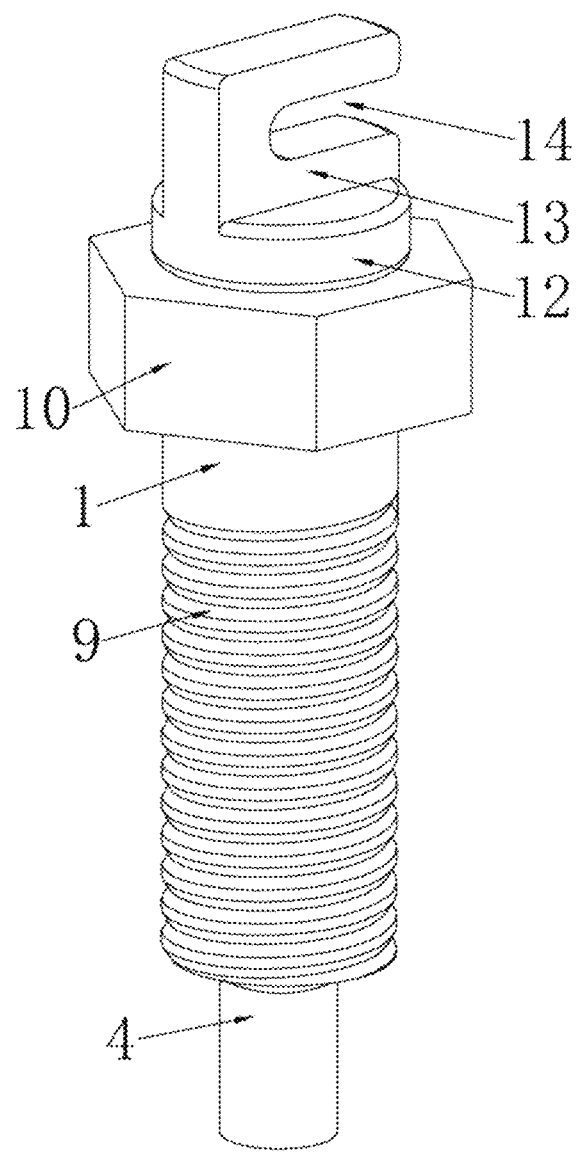
FIG. 1 is a perspective view of the present invention.
Figure 2:
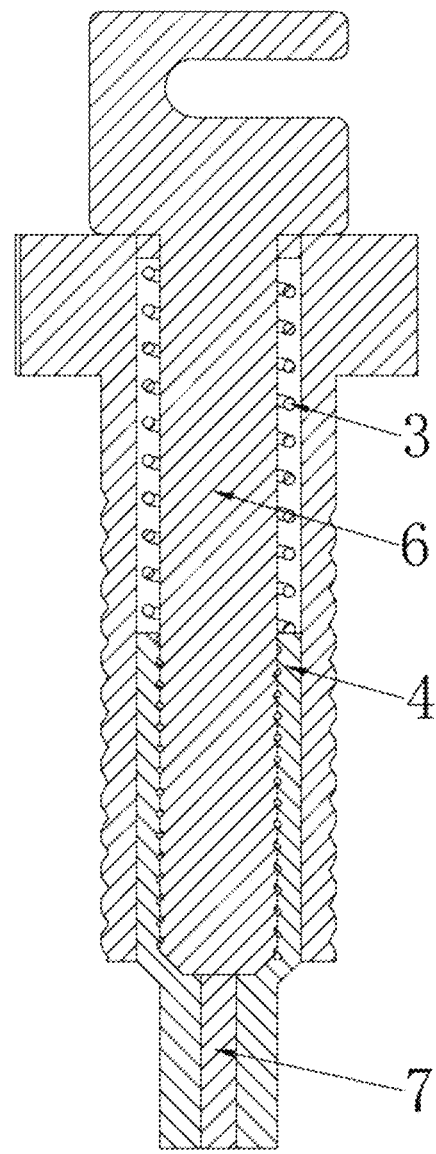
FIG. 2 is a cross-sectional perspective view of FIG. 1 of the present invention.

Other features, objects and advantages of the present invention could be more apparent through detailed description of non-limiting embodiments with reference to the attached drawings (FIGS. 1-4). The invention will be further described below with reference to the following embodiments.

An automatic positioning bolt, as shown in FIGS. 1 to 4, includes a bolt body 1, a mounting hole 2 penetrate vertically is provided inside the bolt body 1, a compression spring 3 is installed inside the mounting hole 2, an insert rod 4 is provided inside the mounting hole 2, the compression spring 3 is provided above the insert rod 4, the diameter of the compression spring 3 is smaller than the diameter of the insert rod 4, an insert hole 5 is provided inside the insert rod 4, a through hole is provided at the top of the insert hole 5, a positioning rod 6 located in the insert hole 5 is installed inside the mounting hole 2, and a magnet rod 7 is provided at the lower end of the insert rod 4.

Figure 3:
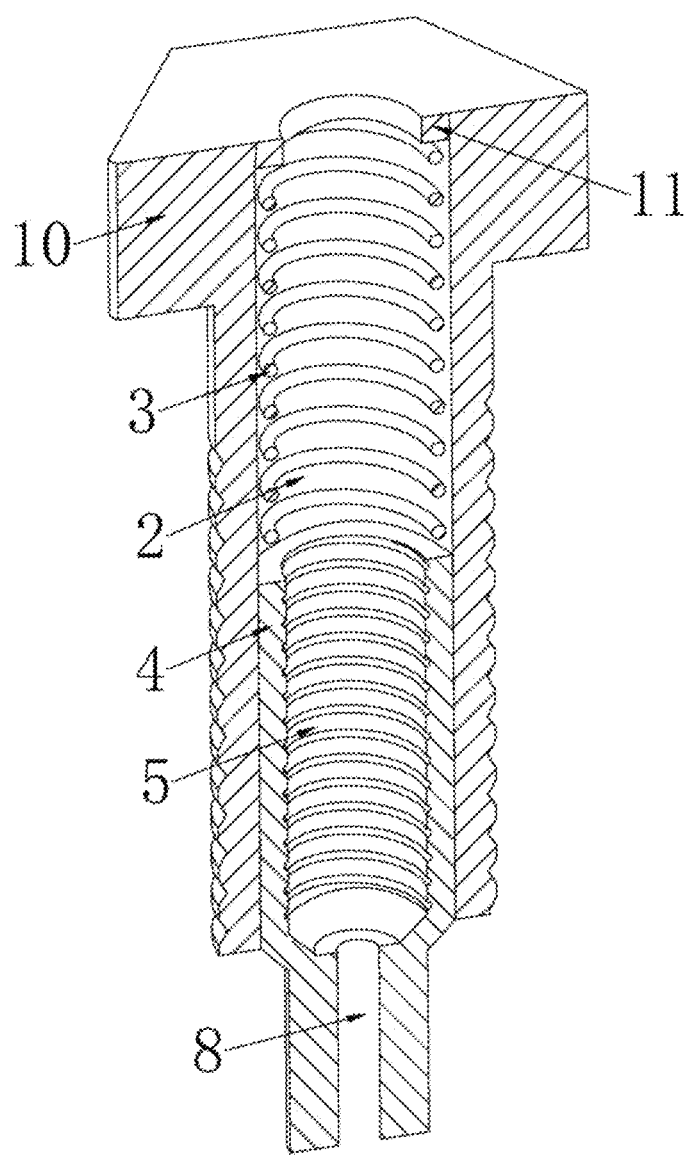
FIG. 3 is a schematic view of the installation position of the insert rod of the present invention.

As shown in FIG. 3, a positioning hole 8 is provided at the bottom of the insert rod 4, the magnet rod 7 is detachably installed inside the positioning hole 8. The bottom hole diameter of the positioning hole 8 is smaller than the diameter of the magnet rod 7 to prevent the magnet rod 7 from detaching from the lower end of the positioning hole 8.

As shown in FIG. 1, external threads 9 are provided on the outer surface of the bolt body 1, a hexagonal block 10 is fixedly connected to the top end of the bolt body 1, and the hexagonal block 10 is provided with a concentric hole that penetrates the mounting hole 2.

As shown in FIG. 3, a blocking ring 11 is fixedly connected to the top of the mounting hole 2. The diameter of the blocking ring 11 is smaller than the diameter of the compression spring 3, so as to prevent the compression spring 3 from falling off from the concentric hole.

Figure 4:
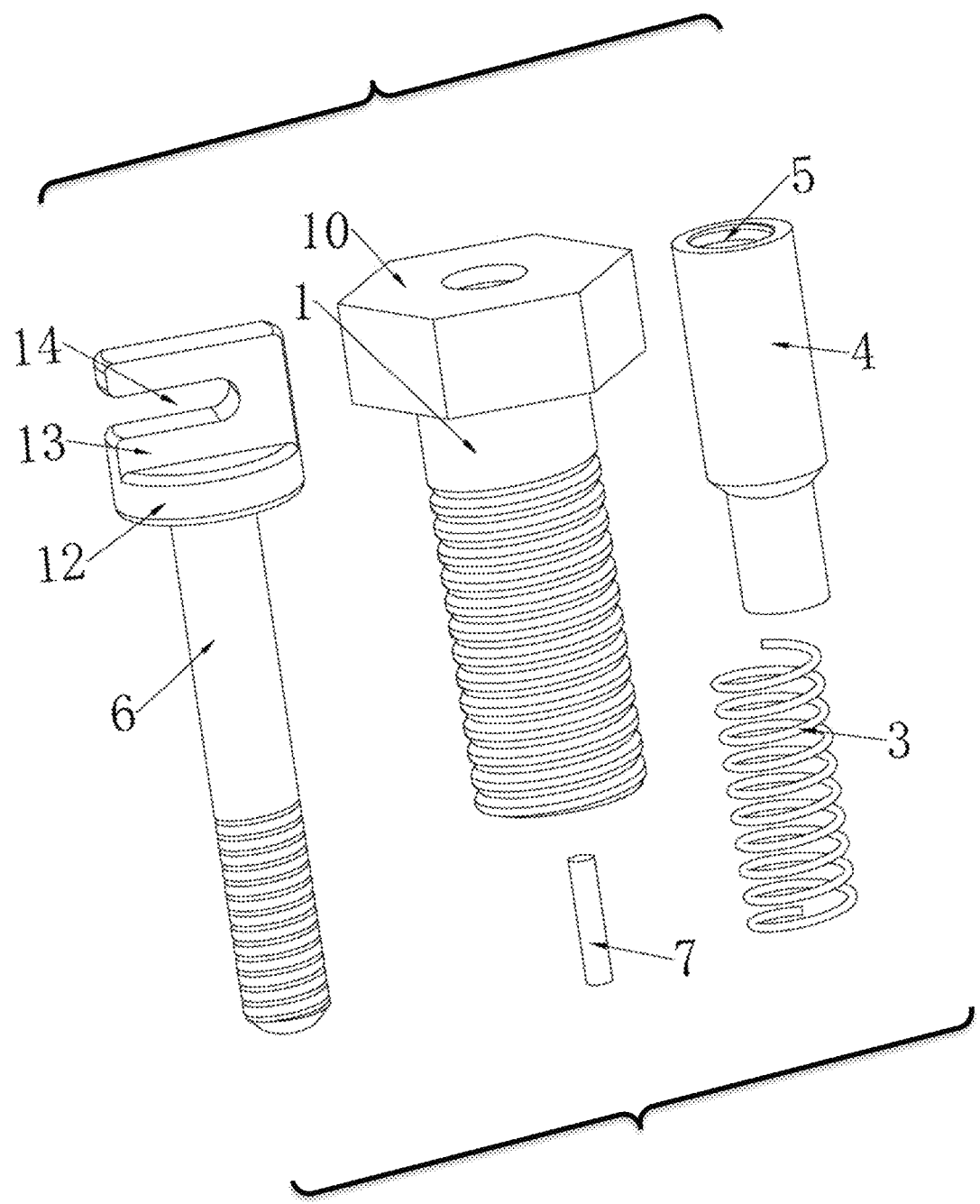
FIG. 4 is a schematic view of the bolt body and the positioning rod structure of the present invention.

As shown in FIG. 4, a round block 12 is fixedly connected to the top of the positioning rod 6, the diameter of the round block 12 is larger than the diameter of the concentric hole, a connecting block 13 is fixedly connected to the top of the round block 12, a notch 14 is provided on the connecting block 13, and the positioning rod 6 is threadedly connected to the insert hole 5.

The working principle of the present invention:

Firstly, take the magnet rod 7 and places it into the positioning hole 8, place the compression spring 3 into the inside of the bolt body 1 from the bottom of the mounting hole 2, place the insert rod 4 into the mounting hole 2 from the bottom of the mounting hole 2, and then inserts the bottom end of the positioning rod 6 into the compression spring 3 from the concentric hole. Secondly, hold the bottom end of the insert rod 4 without moving by one hand, and rotates the connecting block 13 by the other hand, at the same time, the positioning rod 6 is gradually inserted into the inside of the insert hole 5 to achieve the threaded connection between the positioning rod 6 and the insert hole 5. When the insert rod 4 moves upward, its top end presses the bottom of the compression spring 3, and finally the installation of the bolt is completed.

During use, place the object on the iron plate, and insert the bolt body 1 into the threaded hole of the object, and the magnet rod 7 will be adsorbed on the iron plate for positing the object and preventing it from falling. Then rotate the hexagonal block 10 to make the external thread 9 connected with the threaded hole of the object. When the outer end of the bolt body 1 gradually approaches the object, the top of the insert rod 4 continues to press the compression spring 3 to slide into the mounting hole 2. When the bolt body 1 is installed, push the object downward, and the bottom ends of the magnet rod 7 and the insert rod 4 will move along the iron plate. When it moves to the position opening of the iron plate, the rebound force of the compression spring 3 pushes the insert rod 4 into the position opening, thereby realizing automatic positioning of the bolt, ensuring a firm connection between the object and the iron plate, and preventing the object from moving when subjected to force, so that the bolt can be flexibly applied in various occasions for connection, and can maintain a stable connection during long-term use.

In the present invention, the use of orientation words such as "top," "bottom," "inside" are only for the convenience of description, rather than indicating or implying the specific orientation, therefore it should not be construed as being limited to the description of the following embodiments. In addition, it should be noted that the terms "first", "second", "third" and the like in the description and claims of the present invention and the above drawings are used to distinguish similar objects, which are not necessarily used to describe the specific order or sequence. It is to be understood that the data so used are interchangeable under appropriate circumstances in order to describe the embodiments of the invention herein.

Unless otherwise stated, it should be noted that the terms "installed" and "connected" should be understood broadly. For example, "connected" could be fixed connection, detachable connection, integral connection, mechanical connection, electrical connection, direct connection, indirect connection through the intermediate structure, or internal connection between two elements. For those of ordinary skill in this field, the specific meanings of the above terms in the present invention can be understood in specific situations.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. An automatic positioning bolt, including a bolt body (1), a mounting hole (2) penetrate thoroughly is provided inside the bolt body (1), a compression spring (3) provided inside the mounting hole (2), an insert rod (4) located below the compression spring (3) located inside the mounting hole (2), an insert hole (5) provided inside the insert rod (4), a positioning rod (6) located in the insert hole (5) provided inside the mounting hole (2), and a magnet rod (7) located at a lower end of the insert rod (4).

2. An automatic positioning bolt according to claim 1, wherein a positioning hole (8) is provided at a bottom of the insert rod (4), and the magnet rod (7) is installed inside the positioning hole (8).

3. An automatic positioning bolt according to claim 1, wherein an outer surface of the bolt body (1) is provided with external threads (9), and a hexagonal block (10) is fixedly connected to a top end of the bolt body (1).

4. An automatic positioning bolt according to claim 1, wherein a blocking ring (11) is fixedly connected to a top end of the mounting hole (2).

5. An automatic positioning bolt according to claim 1, wherein a round block (12) is fixedly connected to a top end of the positioning rod (6), a connecting block (13) is fixedly connected to the top end of the round block (12), and a notch (14) is formed in the connecting block (13).

* * * * *